United States Patent
Gopalakrishnan et al.

(10) Patent No.: US 11,499,517 B1
(45) Date of Patent: Nov. 15, 2022

(54) ADDITIONAL BATTERY TO AUGMENT STARTER SYSTEM DURING STARTING OF VEHICLE ENGINE

(71) Applicant: GM Global Technology Operations LLC, Detroit, MI (US)

(72) Inventors: Suresh Gopalakrishnan, Troy, MI (US); Chandra S. Namuduri, Troy, MI (US); Pranjal Sharma, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/391,286

(22) Filed: Aug. 2, 2021

(51) Int. Cl.
F02N 11/00 (2006.01)
F02N 11/08 (2006.01)

(52) U.S. Cl.
CPC ........ F02N 11/0866 (2013.01); F02N 11/087 (2013.01)

(58) Field of Classification Search
CPC .............. F02N 11/0866; F02N 11/087; F02N 2011/0877
See application file for complete search history.

(56) References Cited

U.S. PATENT DOCUMENTS

| | | | | |
|---|---|---|---|---|
| 2,729,750 A * | 1/1956 | Carson | ................ | H02J 7/1423 320/105 |
| 3,463,995 A * | 8/1969 | Herold | ................ | F02N 11/04 322/90 |
| 4,161,684 A * | 7/1979 | Ragaly | ................ | H02J 7/1423 322/90 |
| 4,233,552 A * | 11/1980 | Baumbach | .......... | F02N 11/0866 320/DIG. 20 |
| 4,412,137 A * | 10/1983 | Hansen | ................ | F02N 11/0866 307/10.6 |
| 4,564,797 A * | 1/1986 | Binkley | ................ | H02J 7/342 320/105 |
| 4,754,730 A * | 7/1988 | Campagna | .......... | F02N 11/0866 123/179.3 |
| 6,718,927 B2 * | 4/2004 | Goetze | ................ | F02N 11/087 307/10.6 |
| 10,065,585 B2 * | 9/2018 | Iwasaki | ................ | B60R 16/033 |
| 2011/0001354 A1 * | 1/2011 | Lindstrom | .......... | F02N 11/0866 307/9.1 |
| 2014/0250909 A1 * | 9/2014 | Sowden | ................ | H02P 9/08 60/778 |
| 2014/0312687 A1 * | 10/2014 | Gu | ................ | H01M 4/587 429/158 |
| 2016/0137092 A1 * | 5/2016 | Thieme | ................ | B60R 16/03 307/10.6 |
| 2016/0288746 A1 * | 10/2016 | Namuduri | .......... | F02N 11/0866 |
| 2019/0217867 A1 * | 7/2019 | Barthlott | ................ | B60W 40/12 |
| 2020/0295575 A1 * | 9/2020 | Nook | ................ | H02J 7/00047 |
| 2022/0094192 A1 * | 3/2022 | Wood | ................ | H02J 7/345 |

* cited by examiner

*Primary Examiner* — Phutthiwat Wongwian
*Assistant Examiner* — Sherman D Manley
(74) *Attorney, Agent, or Firm* — Cantor Colburn LLP

(57) ABSTRACT

A system in a vehicle includes a starter motor to start an engine of the vehicle. The system also includes a first battery connected to the starter motor to power the starter motor during the start of the engine and a second battery controllably connected in series or in parallel with the first battery to provide additional power to the starter motor during the start of the engine.

20 Claims, 3 Drawing Sheets

ADDITIONAL BATTERY TO AUGMENT STARTER SYSTEM DURING STARTING OF VEHICLE ENGINE

INTRODUCTION

The subject disclosure relates to an additional battery to augment the starter system during the starting of a vehicle engine.

Vehicles (e.g., automobiles, trucks, construction equipment, farm equipment) that have diesel or gasoline engines typically use a starter motor to start the engine. The engine must be turned at some speed to make it start operating (e.g., taking fuel and air into the cylinders and compressing the mixture). This initial turning, referred to as cranking, is done by a starter motor whose gear wheel (i.e., pinion gear) engages with a larger gear ring around the rim of the engine flywheel. The starter motor may also be used during travel in vehicles that include a start-stop system, which shuts off the engine during idling (e.g., at a traffic light) to conserve fuel and limit emissions and restarts the engine when the brake is released. For vehicles with large engines, such as eight cylinder (e.g., V8) engines, the typical starter system may be insufficient in certain conditions such as cold weather. Accordingly, it is desirable to provide an additional battery to augment the starter system during starting of a vehicle engine.

SUMMARY

In one exemplary embodiment, a system in a vehicle includes a starter motor configured to start an engine of the vehicle. The system also includes a first battery connected to the starter motor to power the starter motor during the start of the engine and a second battery controllably connected in series or in parallel with the first battery to provide additional power to the starter motor during the start of the engine.

In addition to one or more of the features described herein, the system also includes a first switch and a second switch to control connection of the second battery in series with the first battery during the start of the engine.

In addition to one or more of the features described herein, the first switch and the second switch are electrically controlled switches or electronic switching devices.

In addition to one or more of the features described herein, the system also includes a controller to control the first switch to be in a closed position and the second switch to be in a closed position to connect the first battery and the second battery in series to the starter motor during the start of the engine.

In addition to one or more of the features described herein, the system also includes a third switch connected between the first switch and ground. The first switch and the third switch controllably connect the second battery to the ground.

In addition to one or more of the features described herein, the controller controls the third switch to be in an open position during the start of the engine.

In addition to one or more of the features described herein, the controller controls the first switch to be in an open position, the second switch to be in an open position, and the third switch to be in a closed position during recharge of the first battery and the second battery via a generator.

In addition to one or more of the features described herein, the system also includes a switch to control connection of the second battery in parallel with the first battery during the start of the engine.

In addition to one or more of the features described herein, the switch is controlled to disconnect the second battery from the first battery after the start of the engine.

In addition to one or more of the features described herein, the second battery is recharged by a generator after the start of the engine.

In another exemplary embodiment, a method of starting a vehicle engine includes coupling a starter motor to the engine, the starter motor configured to start the engine of the vehicle. The method also includes connecting a first battery to the starter motor to power the starter motor during the start of the engine, and controllably connecting a second battery in series or in parallel with the first battery to provide additional power to the starter motor during the start of the engine.

In addition to one or more of the features described herein, the method also includes disposing a first switch and a second switch to control connection of the second battery in series with the first battery during the start of the engine.

In addition to one or more of the features described herein, the first switch and the second switch are electrically controlled switches or electronic switching devices.

In addition to one or more of the features described herein, the method also includes configuring a controller to control the first switch to be in a closed position and the second switch to be in a closed position to connect the first battery and the second battery in series to the starter motor during the start of the engine.

In addition to one or more of the features described herein, the method also includes disposing a third switch between the first switch and ground and configuring the first switch and the third switch to controllably connect the second battery to the ground.

In addition to one or more of the features described herein, the configuring the controller includes configuring the controller to control the third switch to be in an open position during the start of the engine.

In addition to one or more of the features described herein, the configuring the controller includes configuring the controller to control the first switch to be in an open position, the second switch to be in an open position, and the third switch to be in a closed position during recharge of the first battery and the second battery via a generator.

In addition to one or more of the features described herein, the method also includes disposing a switch to control connection of the second battery in parallel with the first battery during the start of the engine.

In addition to one or more of the features described herein, the method also includes controlling the switch to disconnect the second battery from the first battery after the start of the engine.

In addition to one or more of the features described herein, the method also includes arranging a generator to recharge the second battery after the start of the engine.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
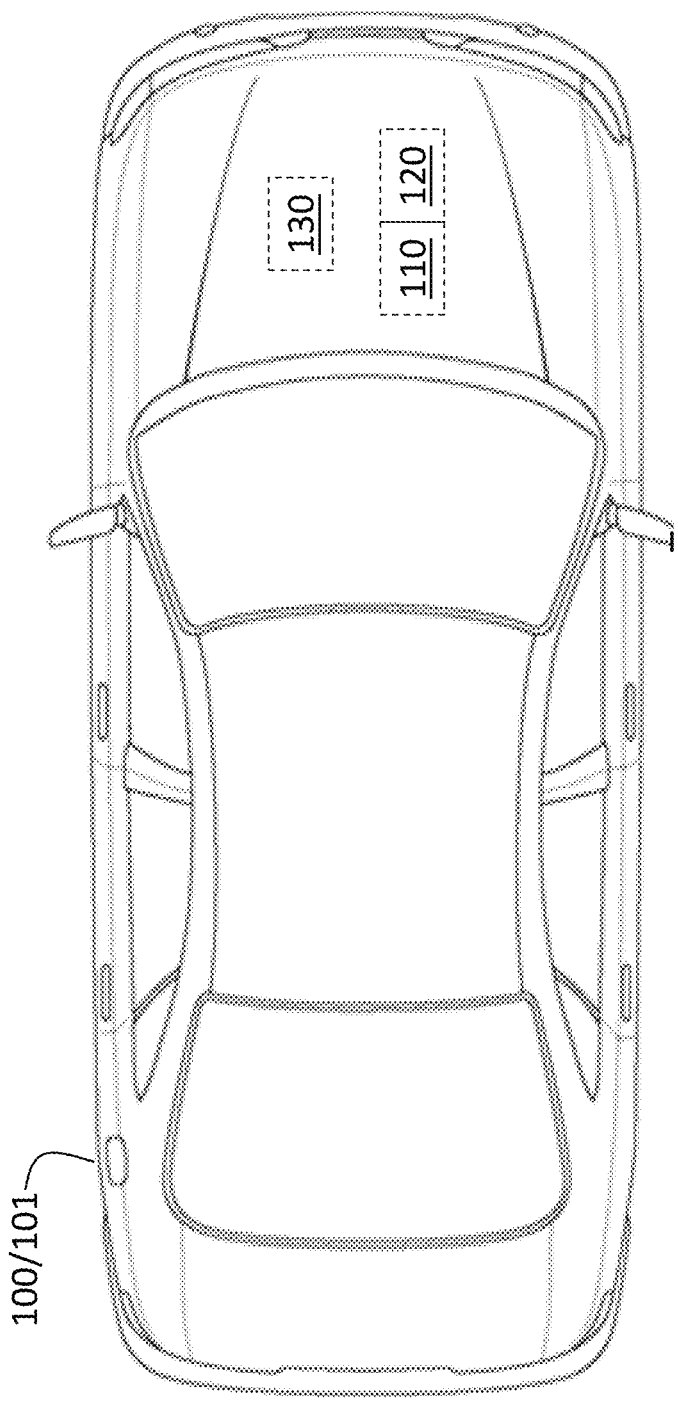
FIG. 1 is a block diagram of a vehicle with an additional battery to augment the start of the engine according to one or more embodiments.

The following description is merely exemplary in nature and is not intended to limit the present disclosure, its application or uses. It should be understood that throughout the drawings, corresponding reference numerals indicate like or corresponding parts and features.

As previously noted, the starter system according to prior approaches, which generally includes one battery (e.g., 12 volt (V) battery), may be insufficient to start the vehicle engine under certain conditions, such as cold temperatures (e.g., below −20 degrees Fahrenheit). Ideally, during the starting process, the starter motor cranks the engine to a predefined cranking speed (e.g., 100 revolutions per minute (rpm)) without the engine subsequently dipping below a minimum cranking speed (e.g., 20 rpm). Specifically, With the prior starter system, a V8 engine may dip to 4 rpm after reaching initially reaching 100 rpm under certain conditions such as cold temperatures. This can result in poor start quality and negatively affect an established noise, vibration, harshness (NVH) metric.

Embodiments of the systems and methods detailed herein relate to an additional battery to augment the starter system during starting of a vehicle engine. According to an exemplary embodiment, the starter system includes an additional battery that may be connected in series with the existing primary battery only during engine start. According to an alternate embodiment, a battery (additional to the starter battery) that is already present for use with accessory loads may be connected in parallel with the existing primary battery as the additional battery during engine start.

In accordance with an exemplary embodiment, FIG. 1 is a block diagram of a vehicle 100 with an additional battery 210 (FIG. 2A) to augment the starter system 110 during starting of the engine 120. The exemplary vehicle 100 shown in FIG. 1 is an automobile 101. As indicated, the vehicle 100 includes the starter system 110 and the engine 120. During engine start, a gear wheel (not shown) of the starter system 110 engages with a larger gear ring (not shown) of the engine 120 to turn (i.e., crank) the engine 120. The starter system 110 is augmented to meet an established NVH metric when the engine 120 is started (i.e., cranked) under challenging conditions such as low temperatures. The vehicle 100 also includes a controller 130. The controller 130 may control elements of the starter system 110, as further discussed, to augment the starter system 110, as needed. The controller 130 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figures 2A, 2B:
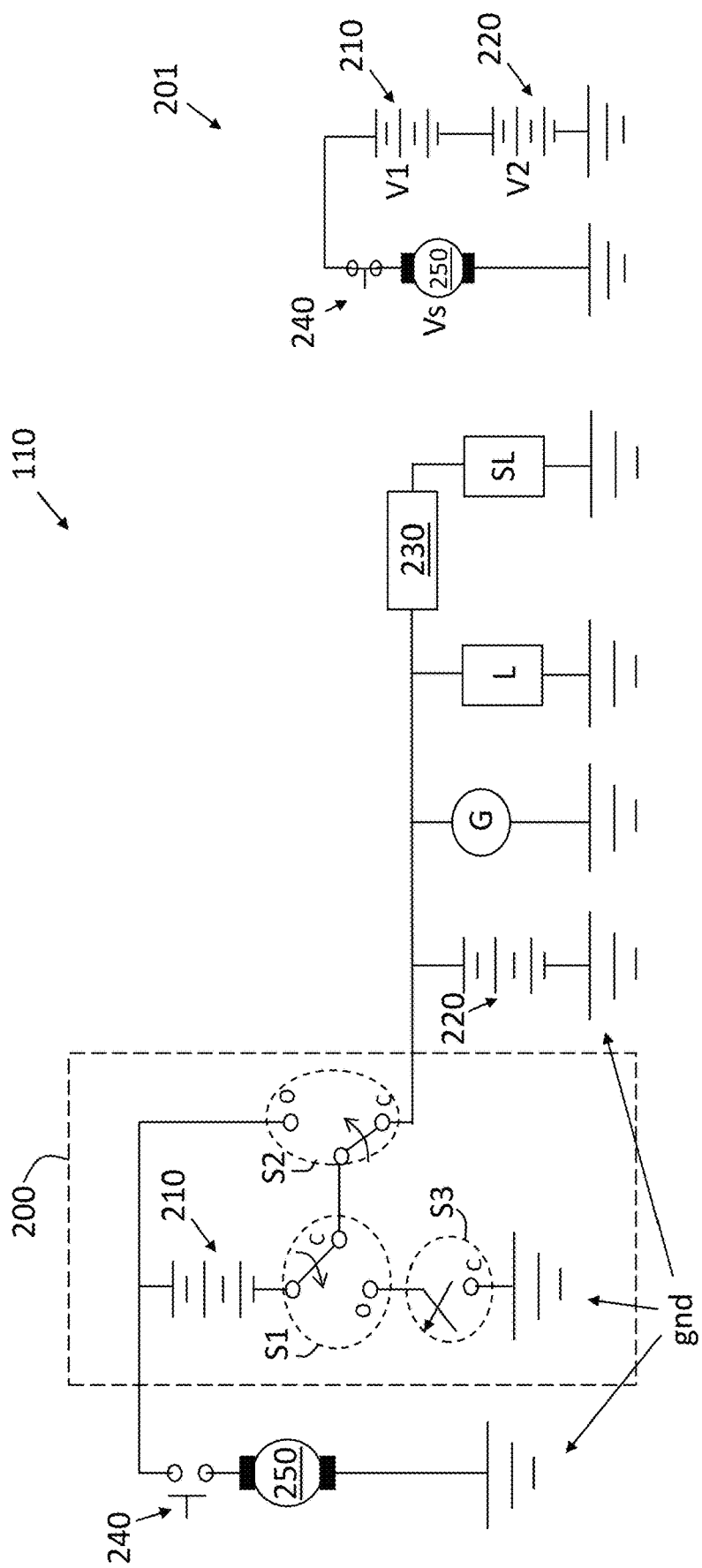
FIG. 2A is a schematic diagram of the starter system with an additional battery to augment the starter system during starting of the engine according to an exemplary embodiment.
FIG. 2B is a circuit diagram of aspects of the starter system shown in FIG. 2A.

FIG. 2A is a schematic diagram of the starter system 110 with an additional battery 210 to augment the starter system 110 during starting of the engine 120 according to an exemplary embodiment. The augmented portion 200 of the starter system 110 is indicated. Without the augmented portion 200, the starter motor 250 is connected, via a relay 240, to a primary battery 220. The primary battery 220 alone powers the starter motor 250 during starting of the engine 120 according to a prior approach and under certain conditions (e.g., temperature not below a threshold value). According to one or more embodiments, the switches S1, S2, and S3 of the augmented portion 200 are controlled to connect an additional battery 210 in series with the primary battery 220 during starting of the engine 120 under more challenging conditions. One or more of the conditions may be referred to as cold cranking, for example (e.g., temperature below −20 degrees Fahrenheit and the vehicle 100 is a V8 powered truck).

Both the primary battery 220 and the additional battery 210 may be 12 V batteries, for example. The primary battery 220 may be an LN3 or LN4 battery while the additional battery 210 may be an LN0 or LN1 battery. The increasing numbers following the "LN" designation indicate increased ampere-hours (Ah) but also increased size and weight. Charge balance analysis may be performed to select the primary battery 220, while cold cranking amperes (CCA) might be a metric used to select the additional battery 210.

The switches S1, S2, S3 may be mechanical contactors (i.e., electrically controlled switches) or solid state relays (i.e., electronic switching devices), for example. The switches S1, S2, S3 may be any type of electrically controllable switches whose positions are controlled by the controller 130, for example. The functionality of the controller 130 discussed herein may instead or additionally be performed by a controller within the starter system 110. The closed position of each switch S1, S2, S3 is indicated by "c" and the open position is indicated by "o" for switches S1 and S2 and shown for switch S3. The switches S1 and S2 may be single pole double throw (SPDT) switches, which have an input terminal always connected to one of two output terminals, while the switch S3 may be a single pole single throw (SPST) switch, which has an input terminal that may or may not be connected to the single output terminal. The labels open "o" and closed "c" are used for explanatory purposes. These labels and the related description may be reversed without changing the functionality of the starter system 110.

As shown in FIG. 2A, the switches S1 and S2 are in the closed position and the switch S3 is in the open position. According to this configuration of the switches S1, S2, S3, the primary battery 220 and the additional battery 210 are connected in series. The switches S1, S2, S3 may be controlled to achieve this configuration during cold start or other challenging conditions, as further discussed with reference to FIG. 2B. Also shown in FIG. 2A are a generator G, loads L, sensitive loads SL, and a converter 230. Ground is indicated as "gnd." The converter 230 may be a direct current (DC) to DC converter that controls the voltage supplied to the sensitive loads SL that require a stable voltage.

The generator G may be used to charge the primary battery 220 and the additional battery 210 when the engine 120 is not being started and based on a configuration of the switches S1, S2, S3. Specifically, the switches S1 and S2 may be controlled to be in the open position while the switch S3 is controlled to be in the closed position. In this case, the primary battery 220 and the additional battery 210 will be connected in parallel with the generator. The additional battery 210 may be recharged in this manner following a cold cranking event, for example.

FIG. 2B is a circuit diagram 201 of aspects of the starter system 110 shown in FIG. 2A. Specifically, the starter motor 250, primary battery 220, and additional battery 210 are shown in the configuration that may be implemented during cold cranking (i.e., switches S1 and S2 are in the closed position and the switch S3 is in the open position as shown in FIG. 2A). As indicated, the primary battery 220 and additional battery 210 are connected in series. As previously noted, this results from controlling the switches S1 and S2 to be closed and controlling switch S3 to be open, as shown in FIG. 2A. The voltages of the additional battery 210 and the primary battery 220 are V1 and V2, respectively. Based on that arrangement, the voltage Vs at the starter motor 250 will be V1+V2. As previously noted, both V1 and V2 may be 12 V, for example. In this case, the voltage Vs at the starter motor 250 is 24 V. As a result of the increased voltage based on the additional battery 210, as compared with the primary battery 220 alone, the torque and speed at the starter motor 250 are increased. The increased torque and speed facilitate a smoother start (e.g., better NVH output) in conditions that may otherwise present a challenge for using the starter motor 250 with only the primary battery 220.

Figures 3A, 3B:
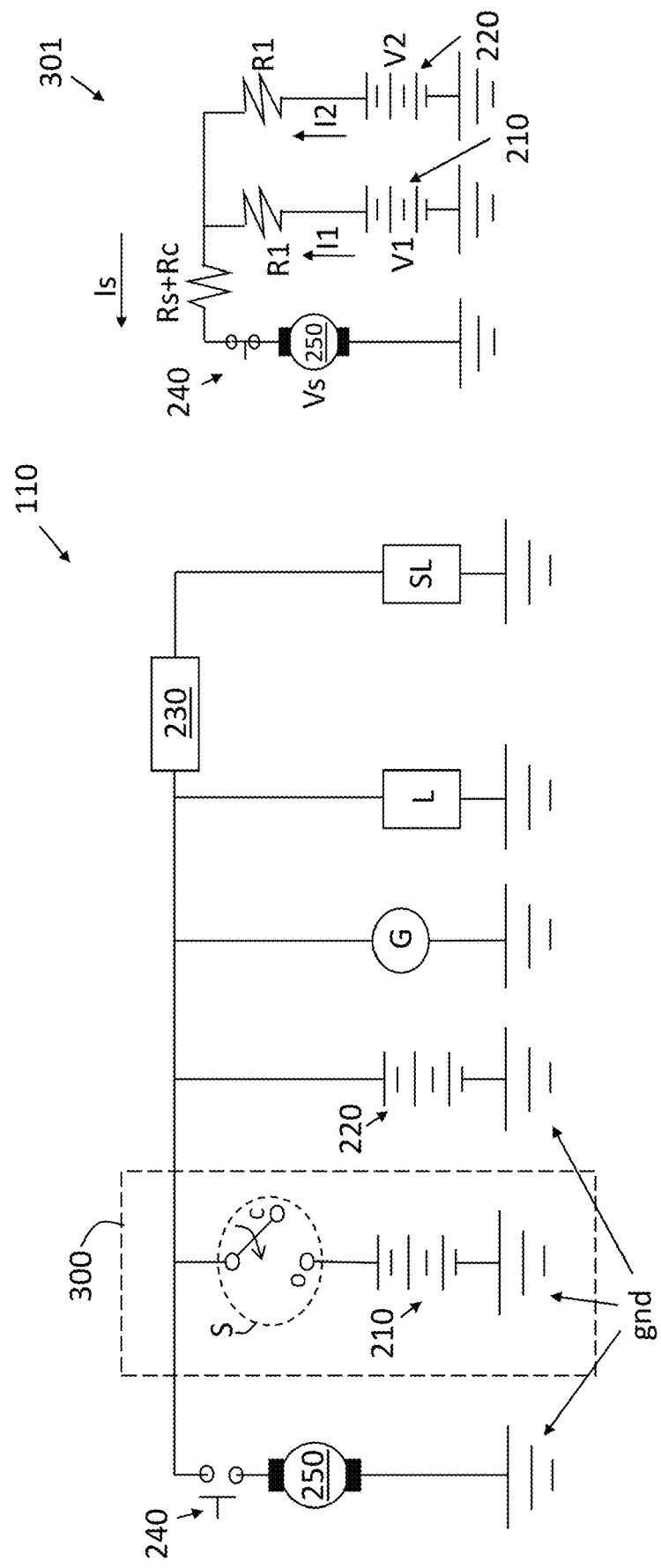
FIG. 3A is a schematic diagram of the starter system with an additional battery to augment the starter system during starting of the engine according to an exemplary embodiment.
FIG. 3B is a circuit diagram of aspects of the starter system shown in FIG. 3A.

FIG. 3A is a schematic diagram of the starter system 110 with an additional battery 210 to augment the starter system 110 during starting of the engine 120 according to an exemplary embodiment. The augmented portion 300 of the starter system 110 is indicated. As noted with reference to FIG. 2A, without the augmented portion 300, the starter motor 250 is connected, via a relay 240, to a primary battery 220. The primary battery 220 alone powers the starter motor 250 during starting of the engine 120 according to a prior approach and under certain conditions (e.g., temperature not below a threshold value). According to one or more embodiments, the switch S of the augmented portion 300 is controlled to connect an additional battery 210 in parallel with the primary battery 220 during starting of the engine 120 under certain (e.g., cold cranking) conditions (e.g., when the temperature is below a threshold value and the vehicle 100 is of a particular type (e.g., has a V8 engine 120)).

As noted with reference to FIG. 2A, the primary battery 220 and the additional battery 210 may both be 12 V batteries, for example. The additional battery 210 may be an existing battery in the vehicle 100 that is used for accessories after the engine 120 is running. This additional battery 210 is employed during starting of the engine 120 according to exemplary embodiments. The primary battery 220 may be an LN3 or LN4 battery while the additional battery 210 may be an LN0 or LN1 battery. As discussed for switches S1, S2, S3, the switch S may be a mechanical contactor, solid state relay, or other electrically controllable switch. The closed position of the switch S is indicated as "c" and the open position is indicated as "o." In alternate embodiments, the labels and the description of switch operation may be reversed.

As shown in FIG. 3A, the switch S is in the closed position. According to this configuration, the additional battery 210 is not connected to the starter motor 250 regardless of the position of the relay 240. When the switch S is controlled to be in the open position (e.g., by the controller 130), the additional battery 210 is connected in parallel with the primary battery 220. This configuration may be implemented by the controller 130 or a controller within the starter system 110 during cold cranking, as further discussed with reference to FIG. 3B.

Like the arrangement in FIG. 2A, a generator G, loads L, sensitive loads SL, and a converter 230 are shown, and ground is indicated as "gnd." The generator G may be used to charge the primary battery 220 and the additional battery 210 when the engine 120 is not being started. That is, with the switch S in the open position, the additional battery 210 may be recharged by the generator G following a cold cranking event, for example.

FIG. 3B is a circuit diagram 301 of aspects of the starter system 110 shown in FIG. 3A. Specifically, the starter motor, primary battery 220, and additional battery 210 are shown in the configuration that may be implemented during cold cranking (i.e., switch S is in the open position). The resistance Rs of the starter motor and the resistance Rc of the cable are indicated along with the resistance R1 associated with the additional battery 210 and the resistance R2 associated with the primary battery 220. The voltages of the additional battery 210 and the primary battery 220 are V1 and V2, respectively and may be 12 V each, for example. Based on that arrangement, the sum of the voltage across the resistor R1 and voltage V1 of the additional battery 210 will be the same as the sum of the voltage across the resistor R2 and the voltage V2 of the primary battery 220. The current Is to the starter motor 250 will be I1+I2 and, thus, will be higher than if only the primary battery 220 were connected to the starter motor 250. The increased current facilitates a smoother start during cold cranking.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system in a vehicle comprising:
a starter motor configured to start a gasoline or diesel-powered engine of the vehicle;
a first battery connected to the starter motor and configured to power the starter motor during the start of the engine; and
a second battery connected in series or in parallel with the first battery to provide additional power to the starter motor during the start of the engine based on a controller controlling at least one switch and connected to ground rather than to the first battery at other times.

2. The system according to claim 1, wherein the at least one switch includes a first switch and a second switch configured to control connection of the second battery in series with the first battery during the start of the engine.

3. The system according to claim 2, wherein the first switch and the second switch are electrically controlled switches or electronic switching devices.

4. The system according to claim 3, further comprising a controller configured to control the first switch to be in a closed position and the second switch to be in a closed position to connect the first battery and the second battery in series to the starter motor during the start of the engine.

5. The system according to claim 4, further comprising a third switch connected between the first switch and the ground, wherein the first switch and the third switch are configured to controllably connect the second battery to the ground.

6. The system according to claim 5, wherein the controller is configured to control the third switch to be in an open position during the start of the engine.

7. The system according to claim 5, wherein the controller is configured to control the first switch to be in an open position, the second switch to be in an open position, and the third switch to be in a closed position during recharge of the first battery and the second battery via a generator.

8. The system according to claim 1, wherein the at least one switch includes a switch configured to control connection of the second battery in parallel with the first battery during the start of the engine.

9. The system according to claim 8, wherein the switch is controlled to disconnect the second battery from the first battery after the start of the engine.

10. The system according to claim 9, wherein the second battery is configured to be recharged by a generator after the start of the engine.

11. A method of starting a vehicle engine, the method comprising:
coupling a starter motor to the engine, wherein the engine is gasoline or diesel-powered, the starter motor configured to start the engine of the vehicle;
connecting a first battery to the starter motor to power the starter motor during the start of the engine, wherein the starter motor requires the first battery to start the engine; and
connecting a second battery in series or in parallel with the first battery to provide additional power to the starter motor during the start of the engine based on a controller controlling at least one switch and connecting the second battery to ground rather than to the first battery at other times.

12. The method according to claim 11, further comprising disposing a first switch and a second switch to control connection of the second battery in series with the first battery during the start of the engine.

13. The method according to claim 12, wherein the first switch and the second switch are electrically controlled switches or electronic switching devices.

14. The method according to claim 13, further comprising configuring a controller to control the first switch to be in a closed position and the second switch to be in a closed position to connect the first battery and the second battery in series to the starter motor during the start of the engine.

15. The method according to claim 14, further comprising disposing a third switch between the first switch and the ground and configuring the first switch and the third switch to controllably connect the second battery to the ground.

16. The method according to claim 15, wherein the configuring the controller includes configuring the controller to control the third switch to be in an open position during the start of the engine.

17. The method according to claim 15, wherein the configuring the controller includes configuring the controller to control the first switch to be in an open position, the second switch to be in an open position, and the third switch to be in a closed position during recharge of the first battery and the second battery via a generator.

18. The method according to claim 11, further comprising disposing a switch to control connection of the second battery in parallel with the first battery during the start of the engine.

19. The method according to claim 18, further comprising controlling the switch to disconnect the second battery from the first battery after the start of the engine.

20. The method according to claim 19, further comprising arranging a generator to recharge the second battery after the start of the engine.

* * * * *